UNITED STATES PATENT OFFICE.

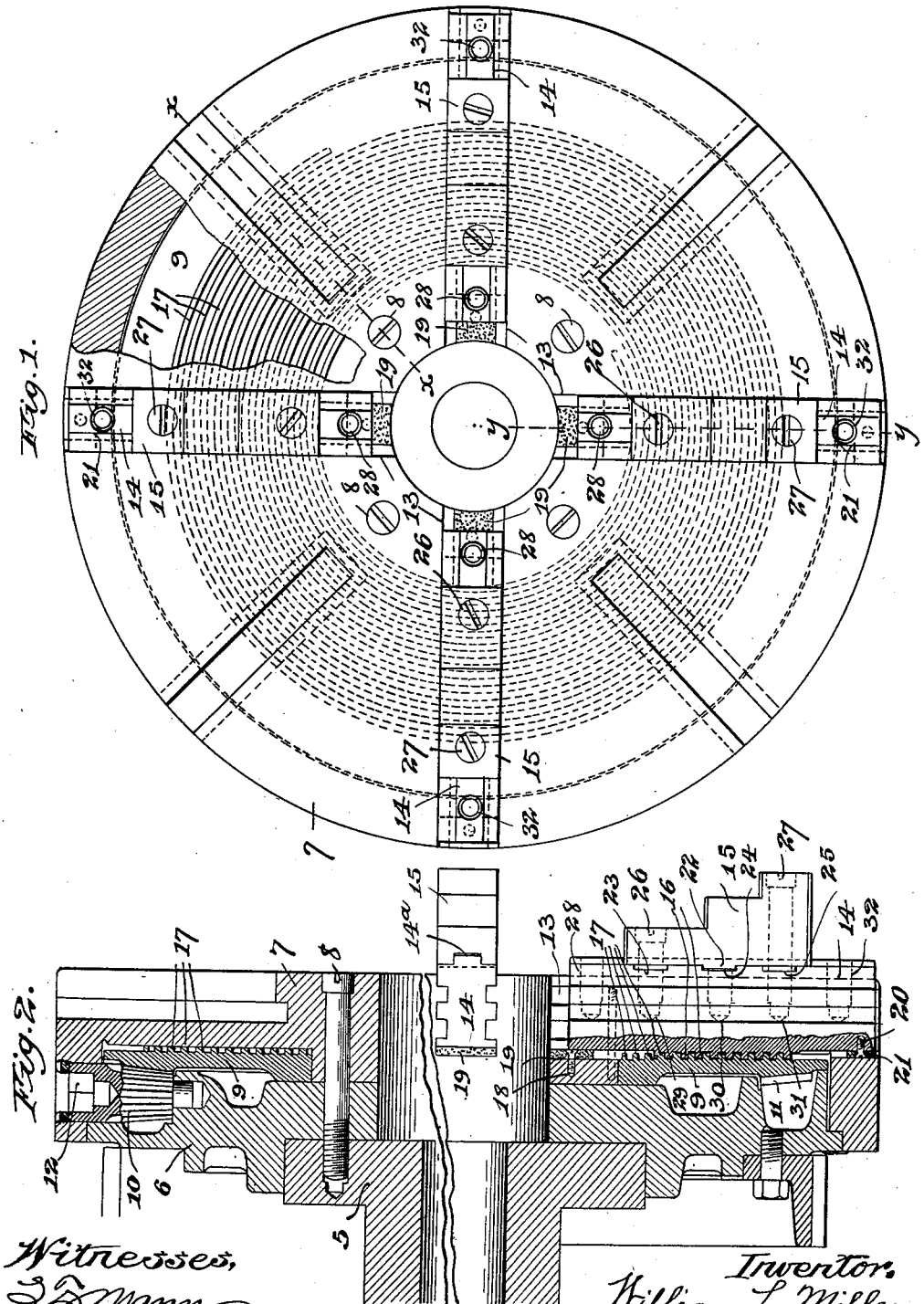

WILLIAM L. MILLER, OF MADISON, WISCONSIN, ASSIGNOR TO GISHOLT MACHINE COMPANY, OF MADISON, WISCONSIN, A CORPORATION OF WISCONSIN.

CHUCK.

1,007,132. Specification of Letters Patent. Patented Oct. 31, 1911.

Application filed February 21, 1911. Serial No. 610,077.

*To all whom it may concern:*

Be it known that I, WILLIAM L. MILLER, a citizen of the United States, residing at Madison, in the county of Dane and State of Wisconsin, have invented certain new and useful Improvements in Chucks, of which the following is a specification.

This invention relates to chucks such as are used in lathes, boring machines, and other similar machines employing a work-holder; and the invention resides in a novel means for rendering the chuck dust-proof.

In that type of chucks known as scroll chucks a serious difficulty heretofore encountered has resulted from the tendency of dust to work into the teeth of the coöperating scrolls on the scroll plate and inner sides of the chuck-jaws, producing clogging and sticking and rendering adjustment difficult. As a remedy for this difficulty my invention resides in the provision of a dust-proof wiper or wipers, preferably of felt, located between either or both of the inner and outer ends of the jaws and the bases of the grooves or channels in which they slide; and in the preferred construction these wipers are so secured that the jaws may be taken on and off the chuck-body without disturbing the wipers or detaching them from the parts to which they are secured.

The invention will be readily understood when considered in connection with the accompanying drawings in which—

Figure 1 is a face view of the chuck, partly broken out to show the chuck scroll; and Fig. 2 is a broken sectional view substantially on the lines *x—x* and *y—y* of Fig. 1, with the chuck appearing partly in side elevation.

Referring to the drawing, 5 designates the chuck-spindle, 6 the back plate, and 7 the chuck-body, which parts are securely united by the screws 8. Between the back plate 6 and chuck-body 7 is mounted the usual scroll 9 driven by pinions 10 journaled in the periphery of the back plate and chuck-body and meshing with a bevel gear 11 on the back of the scroll 9; the shafts of the pinions 10 being provided with wrench-holds 12 for the insertion of a suitable tool for turning the pinions. The chuck-body 7 is provided in its outer face with the usual tongued channels 13 adapted to receive the chuck-jaws.

The parts as thus far described are standard construction and well understood by those skilled in the art.

Slidably mounted in the channels 13 are two-part chuck-jaws each comprising a jaw base 14 and a jaw proper 15. The inner face of each jaw base 14 is provided with teeth 16 which engage the teeth 17 of the scroll 9 in the usual way. Screwed to the base of the channel 13 at its inner end by a screw 18 is a felt wiper 19, the outer surface of which engages the inner end portion of the base of the jaw base 14; and similarly secured by a screw 20 to the outer end portion of the jaw base 14 is another felt wiper 21, the outer face of which slidingly engages the outer end of the base of the channel 13. These wipers 19 and 21 guard the coöperating teeth of the jaws and scroll at both ends of the jaws against the entrance of dust which has heretofore proved a serious annoyance in machines of this character. It will be observed that by securing the inner wiper to the base of the channel and the outer wiper to the base of the jaw, the jaw can be withdrawn and replaced without the necessity of removing the wipers from the parts to which they are respectively attached.

Mounted on the outer face of the jaw base 14 by a longitudinal tongue-and-groove joint 14$^a$ is the jaw proper 15, the latter being adjustable to several positions on the jaw base (herein shown as three in number) by means of a cross-tongue 22 on the underside of the jaw member 15 which may engage any one of three cross-grooves 23, 24, and 25 in the outer face of the jaw base 14, and being secured in adjusted position by screws 26 and 27 passed through the jaw member 15 and threaded into two of a series of tapped holes 28, 29, 30, 31, and 32 formed at suitable points to accommodate the screws 26 and 27 in the outer face of the jaw base.

I have herein shown the chuck-head as provided with four jaws, but it will be understood that my invention is applicable to a chuck having a greater or less number of jaws, the particular number of the latter being entirely immaterial.

I claim—

1. In a chuck, the combination with a chuck-body radially channeled to receive a chuck-jaw, and a scroll rotatably mounted in said chuck-body, of a chuck-jaw slidably mounted in said channel and having teeth engaging said scroll, and a wiper located between the inner end portions of the base of the jaw and the base of the channel, substantially as described.

2. In a chuck, the combination with a chuck-body radially channeled to receive a chuck-jaw, and a scroll rotatably mounted in said chuck-body, of a chuck-jaw, slidably mounted in said channel and having teeth engaging said scroll, and a wiper located between the inner end portions of the base of the jaw and the base of the channel and secured to the latter, substantially as described.

3. In a chuck, the combination with a chuck-body radially channeled to receive a chuck-jaw, and a scroll rotatably mounted in said chuck-body, of a chuck-jaw slidably mounted in said channel and having teeth engaging said scroll, and a wiper located between the outer end portions of the base of the jaw and the base of the channel, substantially as described.

4. In a chuck, the combination with a chuck-body radially channeled to receive a chuck-jaw, and a scroll rotatably mounted in said chuck-body, of a chuck-jaw slidably mounted in said channel and having teeth engaging said scroll, and a wiper located between the outer end portions of the base of the channel and the base of the jaw and secured to the latter, substantially as described.

5. In a chuck, the combination with a chuck-body radially channeled to receive a chuck-jaw, and a scroll rotatably mounted in said chuck-body, of a chuck-jaw slidably mounted in said channel and having teeth engaging said scroll, and wipers located between the base of the channel and the base of the jaw at their inner and outer ends, respectively, substantially as described.

6. In a chuck, the combination with a chuck-body radially channeled to receive a chuck-jaw, and a scroll rotatably mounted in said chuck-body, of a chuck-jaw slidably mounted in said channel and having teeth engaging said scroll, and wipers secured respectively to the inner end of the base of the channel and the outer end of the base of the jaw, substantially as described.

WILLIAM L. MILLER.

Witnesses:
D. H. WRIGHT,
M. E. GAECKS.